(12) United States Patent
Burkhardt

(10) Patent No.: US 8,833,621 B2
(45) Date of Patent: Sep. 16, 2014

(54) LADDER RACK FOR PICKUP TRUCKS THAT SWINGS DOWN FOR LOADING

(71) Applicant: Mark Louis Burkhardt, Navarre, FL (US)

(72) Inventor: Mark Louis Burkhardt, Navarre, FL (US)

( * ) Notice: Subject to any disclaimer, the term of this patent is extended or adjusted under 35 U.S.C. 154(b) by 90 days.

(21) Appl. No.: 13/651,366

(22) Filed: Oct. 12, 2012

(65) Prior Publication Data

US 2013/0093203 A1 Apr. 18, 2013

Related U.S. Application Data

(60) Provisional application No. 61/547,527, filed on Oct. 14, 2011.

(51) Int. Cl.
*B60P 1/16* (2006.01)
*B60P 3/40* (2006.01)

(52) U.S. Cl.
CPC .................................. *B60P 3/40* (2013.01)
USPC ........................................ 224/405; 224/403

(58) Field of Classification Search
USPC .......... 224/400–403, 405, 519–521; 211/205, 211/196, 175, 207; 248/276.1, 284.1, 248/188.1, 188.2, 309.1, 317, 323
See application file for complete search history.

(56) References Cited

U.S. PATENT DOCUMENTS

| | | | |
|---|---|---|---|
| 5,651,484 A * | 7/1997 | Fugman | 224/405 |
| 6,360,930 B1 * | 3/2002 | Flickenger | 224/310 |
| D494,532 S * | 8/2004 | Reese | D12/406 |
| 6,929,228 B2 * | 8/2005 | Whitaker et al. | 248/284.1 |
| 2004/0047716 A1 * | 3/2004 | Hendley et al. | 414/462 |
| 2007/0170217 A1 * | 7/2007 | Lemoine | 224/405 |
| 2008/0079277 A1 * | 4/2008 | Wethington | 296/3 |
| 2009/0140021 A1 * | 6/2009 | Richter et al. | 224/310 |
| 2009/0255966 A1 * | 10/2009 | Prapavat | 224/403 |

\* cited by examiner

*Primary Examiner* — Adam Waggenspack
(74) *Attorney, Agent, or Firm* — J. Nevin Shaffer, Jr.

(57) ABSTRACT

A ladder rack for a pickup truck can swing from a raised position to a lowered position for loading and retrieving a ladder. The ladder rack includes an upper support section attached with a hinge to a lower support so that the assembly that the ladder attaches to can swing to a horizontal, lowered position. This allows the person installing the ladder, or whatever is being transported such as pipes, canoes, kayaks, and the like, to remain outside the truck box to install and attach the ladder. The ladder can then be rotated upwards with the assistance of a hydraulic cylinder to the travel position and locked in to place with a wire lock pin.

20 Claims, 4 Drawing Sheets

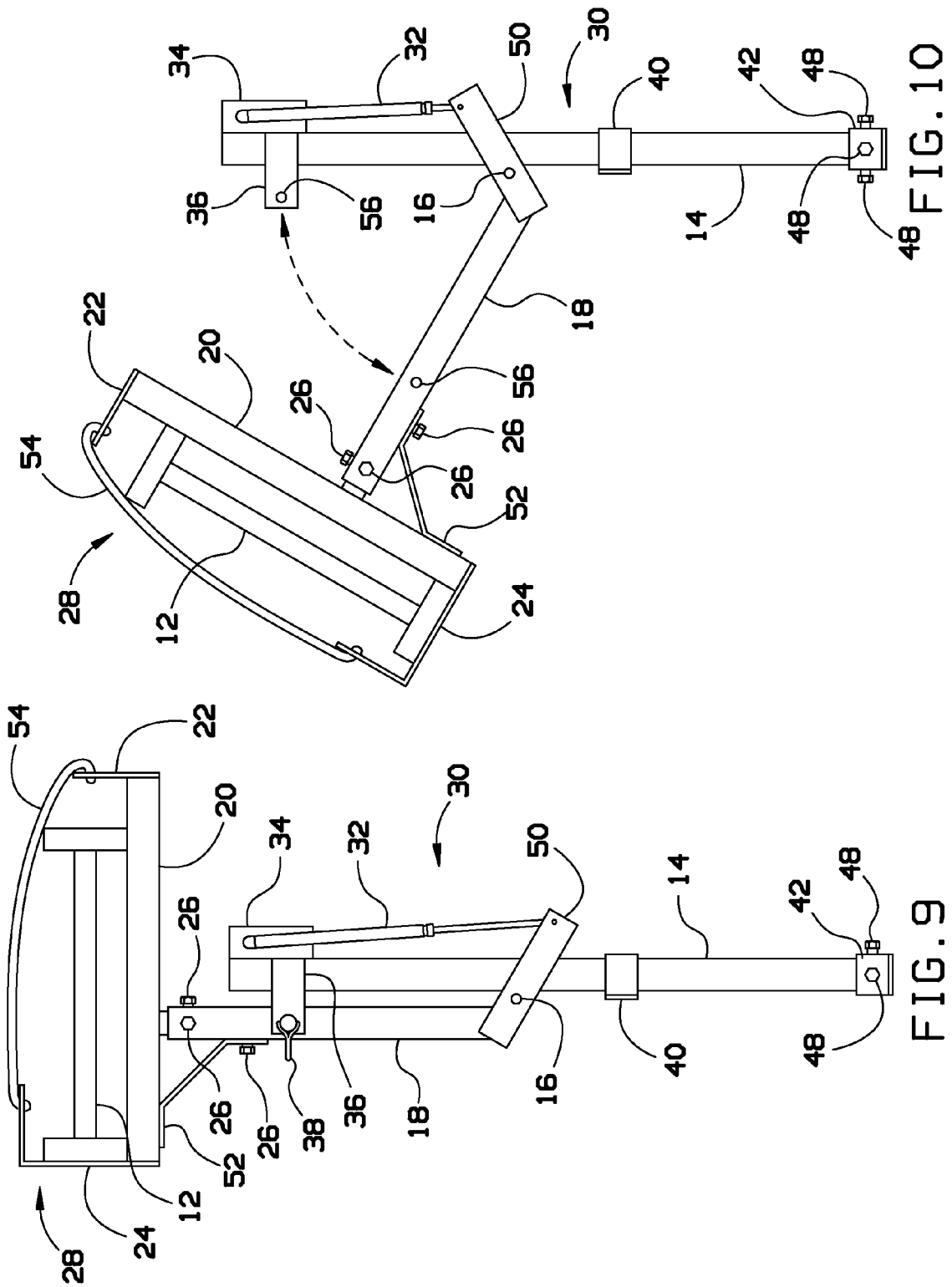

LADDER RACK FOR PICKUP TRUCKS THAT SWINGS DOWN FOR LOADING

CROSS-REFERENCE TO RELATED APPLICATION

This application claims the benefit of priority of U.S. provisional application No. 61/547,527, filed Oct. 14, 2011, the contents of which are herein incorporated by reference.

BACKGROUND OF THE INVENTION

The present invention relates to ladder racks and, more particularly, to a ladder rack for pickup trucks that swings down for loading.

Current ladder racks require the ladder to be lifted onto supports in the truck and then the person installing the rack must climb in the truck to secure the ladder to the supports. Current ladder racks remain stationary within the truck box. They require removal and attachment of ladders or other articles that are being carried to take place inside the truck bed.

As can be seen, there is a need for a ladder rack that provides easy placement and removal of a ladder from a truck.

SUMMARY OF THE INVENTION

In one aspect of the present invention, a movable truck rack comprises a lower support attachable to a truck box; an upper support movable between a travel position, disposed alongside of the lower support, and a loading position, disposed at an angle relative to the lower support; a locking mechanism adapted to lock the upper support in the travel position, adjacent to the lower support; and a mounting assembly attached to an end of the upper support, the mounting assembly adapted to contain an item to be carried.

In another aspect of the present invention, a movable truck ladder rack comprises a lower support; upper mounting brackets fitting about the lower support and lower mounting brackets fitting on an end of the lower support, the upper and lower mounting brackets attached to a truck box; an upper support movable between a travel position, disposed alongside of the lower support, and a loading position, disposed at an angle relative to the lower support; a lift assist cylinder disposed between the lower support and a hinge plate pivotably attached to the upper support, the lift assist cylinder operable to assist a user in moving the mounting assembly from the loading position to the travel position; a locking mechanism adapted to lock the upper support in the travel position, adjacent to the lower support; and a mounting assembly attached to an end of the upper support, the mounting assembly adapted to contain an item to be carried.

These and other features, aspects and advantages of the present invention will become better understood with reference to the following drawings, description and claims.

BRIEF DESCRIPTION OF THE DRAWINGS

FIG. 9 is a side view of the ladder rack of FIG. 1 in a raised position; and FIG. 10 is a side view of the ladder rack of FIG. 1 in a lowered position.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a ladder rack for a pickup truck that can swing from a raised position to a lowered position for loading and retrieving a ladder. The ladder rack includes an upper support section attached with a hinge to a lower support so that the assembly that the ladder attaches to can swing to a horizontal, lowered position. This allows the person installing the ladder, or whatever is being transported such as pipes, canoes, kayaks, and the like, to remain outside the truck box to install and attach the ladder. The ladder can then be rotated upwards with the assistance of a hydraulic cylinder to the travel position and locked in to place with a wire lock pin.

Referring now to FIGS. 1 through 10, a ladder rack can include front and rear ladder rack assemblies 10. The ladder rack assemblies 10 can be mounted on a pickup truck 60 and can be used to carry a ladder 12.

Figure 7:
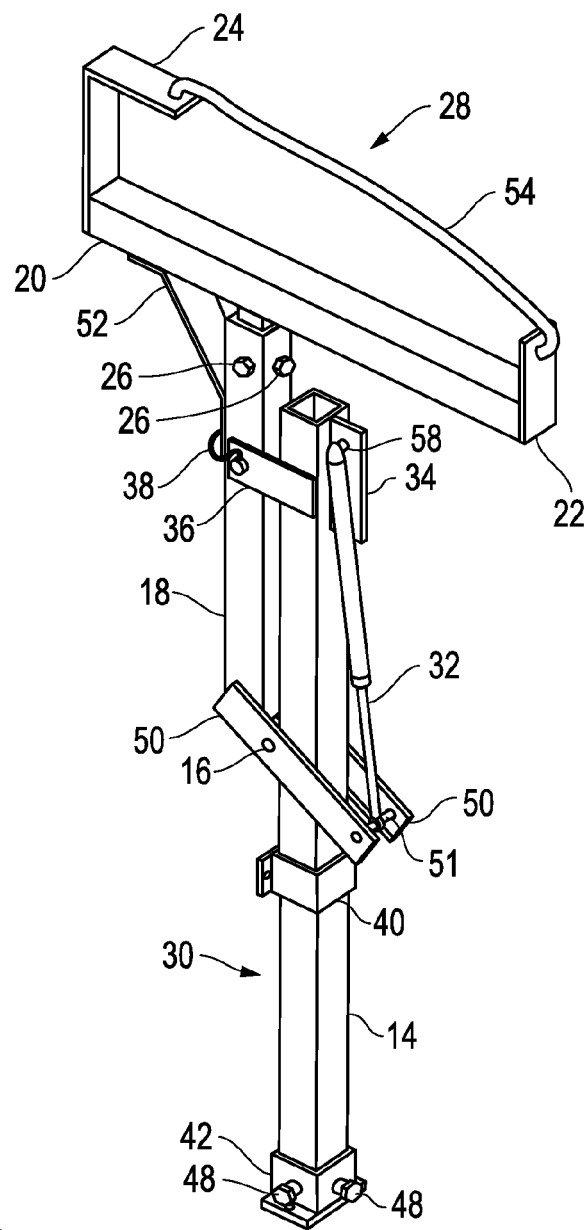
FIG. 7 is a rear side perspective view of the ladder rack of FIG. 1.
Figure 8:
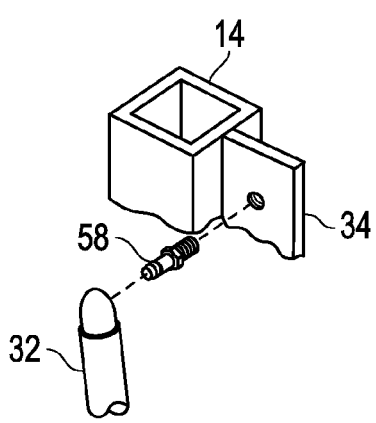
FIG. 8 is a detailed perspective view showing the hydraulic lift assist cylinder and the hydraulic lift assist bracket of the ladder rack of FIG. 1.

A support assembly 30 can include an upper support arm 18 to rotate from a vertical, travel position to a horizontal, loading position. The pivot hinge plate 50 is also the lower attachment point for the hydraulic assist cylinder 32. The assist cylinder 32 is attached to the lower support 14 by a bracket or plate 34, the plate 34 (as shown in FIG. 7 for example) extends from the back of the lower support 14, and a mounting pin 58 so that as the upper support arm 18 is rotated to the load position, the cylinder plunger arm is compressed. The extension force of the assist cylinder 32 assists in lifting the load placed on a upper mounting assembly 28 to the travel position. The upper mounting assembly 28 can then be locked with a locking pin 38 through a hole 56 in a guide bracket 36.

Figure 1:
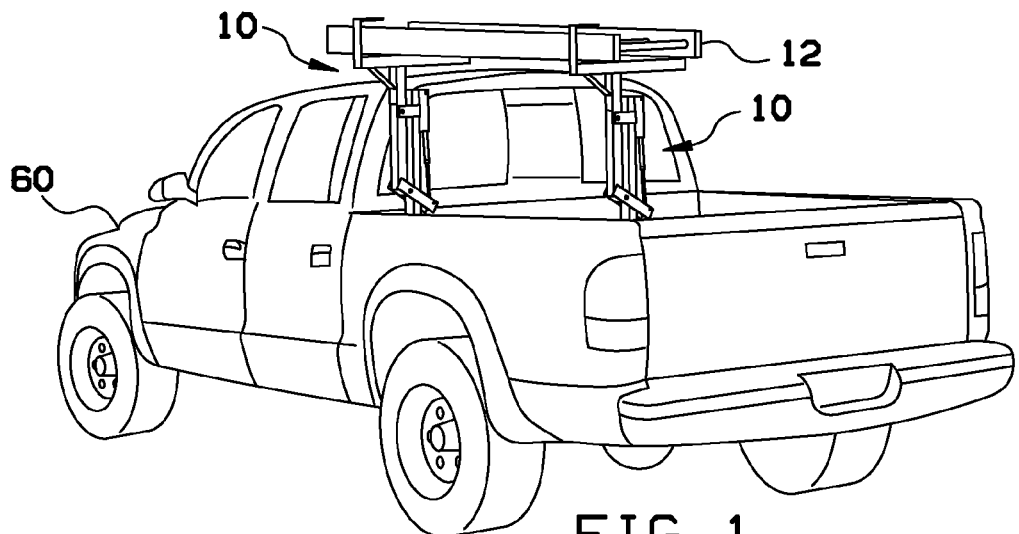
FIG. 1 is a perspective view of a ladder rack, installed in a pickup truck, according to an exemplary embodiment of the present invention.
Figure 2:
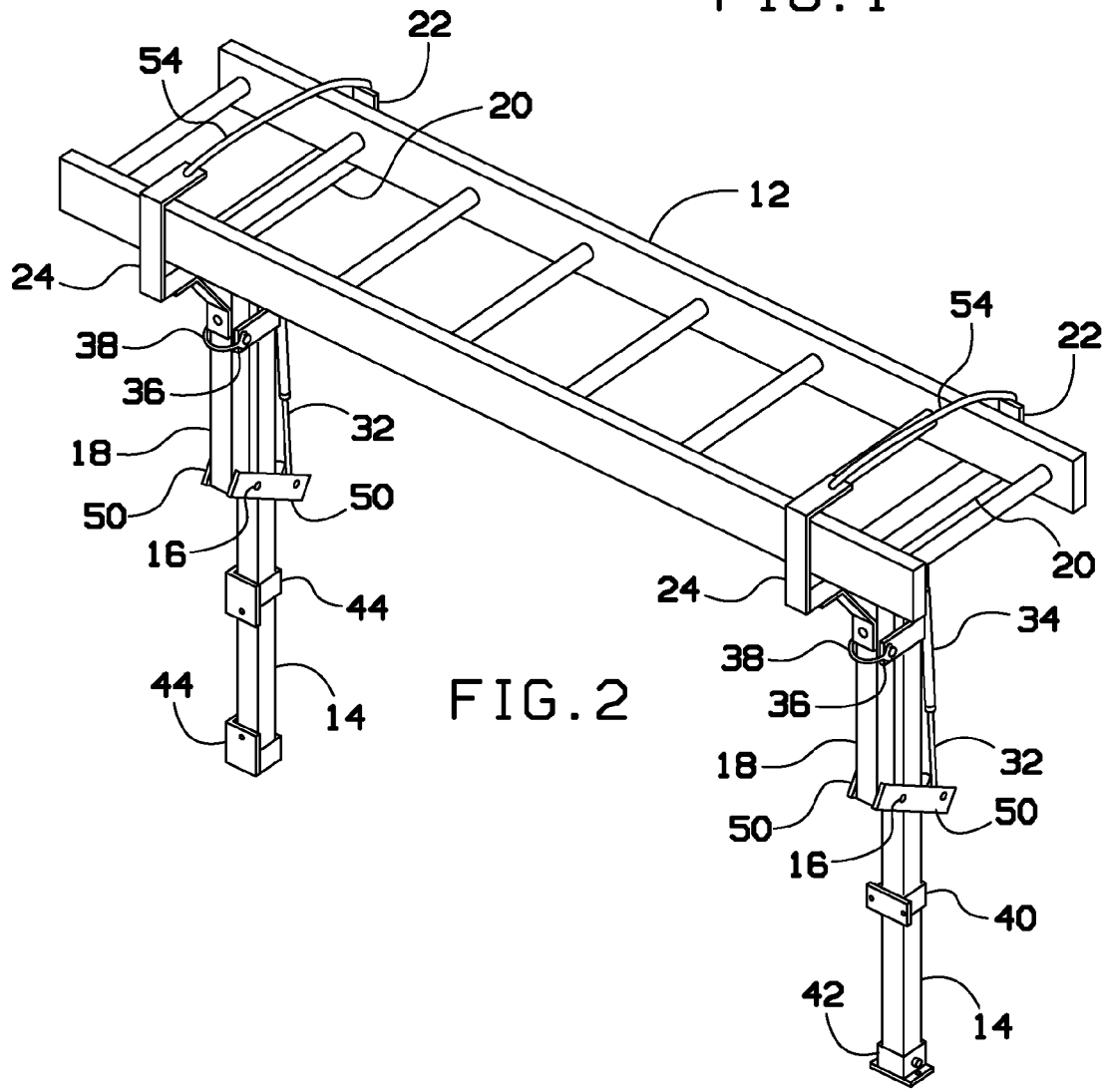
FIG. 2 is a perspective view of the ladder rack of FIG. 1, with the ladder in a transport position.
Figure 3:
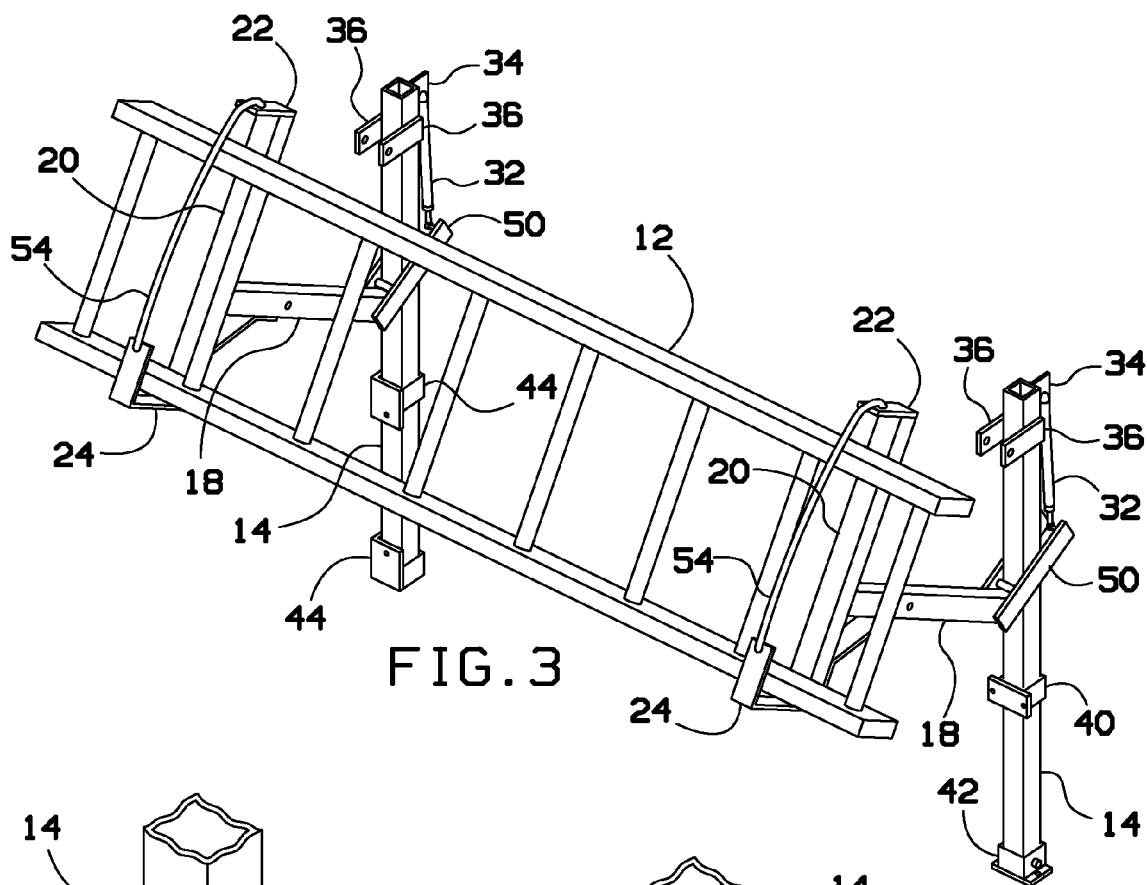
FIG. 3 is a perspective view of the ladder rack of FIG. 1, with the ladder moved down into a loading position.
Figure 4:
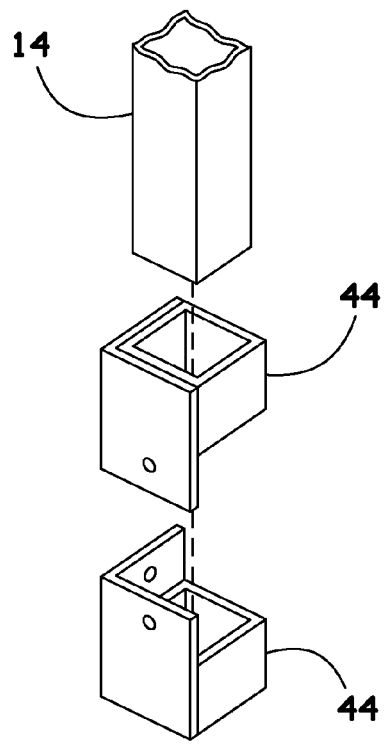
FIG. 4 is a detailed perspective view of a front ladder rack mounting bracket assembly of the ladder rack of FIG. 1.
Figure 5:
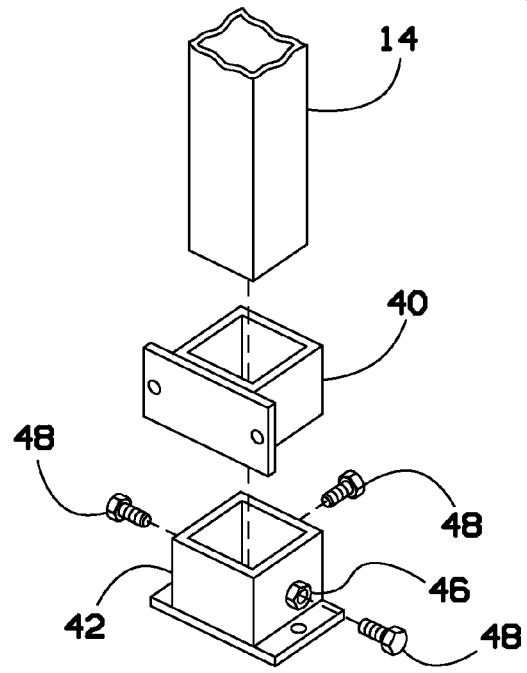
FIG. 5 is a detailed perspective view of a rear ladder rack mounting bracket assembly of the ladder rack of FIG. 1.
Figure 6:
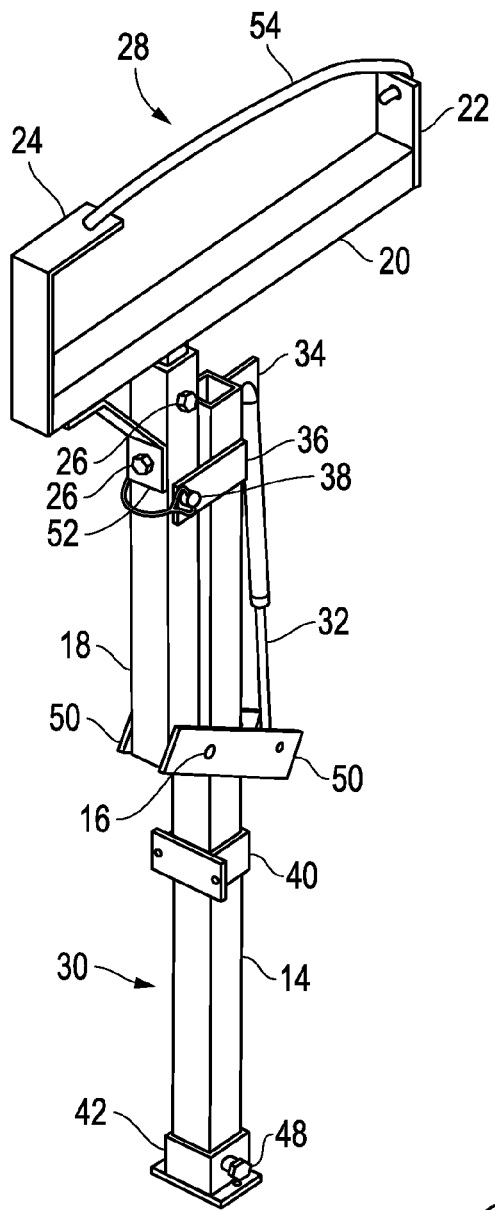
FIG. 6 is a front side perspective view of the ladder rack of FIG. 1.

The upper mounting assembly 28 can be attached to the upper support arm 18 with locking bolts 26. The upper mounting assembly 28 can include a base tubing 20 having a curved flatbar 24 at one end thereof and a flatbar 22 at an opposite end thereof. The curved flatbar 24 can be designed to wrap partially around a ladder, as shown in FIG. 3. The cord 54 can interconnect the curved flatbar 24 with the flatbar 22. A flat bar brace 52 can span from the base tubing 20 to the upper support arm 18 to help stabilize the upper mounting assembly 28.

When the upper support arm 18 is rotated to the vertical, load position, the ladder 12, or whatever is being carried, can be placed on the upper mounting assembly 28. The ladder 12 can then be securely attached to the upper mounting assembly 28 by elastic cords 54, tie down straps, rope, or whatever method is suitable for the load being carried. When the load has been secured, it can then be rotated to the travel position and secured for travel with the locking pin 38.

Prior to a load being placed on the rack assemblies 10, the complete rack assembly would have been inserted into the front and rear mounting brackets 44 (that includes the upper mounting bracket 40 and the lower mounting bracket 42) and then secured by tightening bolts 48 located on mounting brackets 40, 42.

The complete ladder rack may be made from any material that can be connected using bolts or welding. Some of the more common materials would be steel or aluminum. The length of the lower and upper support would be determined by the application and the truck design. The upper mounting assembly could be designed to accommodate whatever is being carried. It could be designed to support ladders, pipe, lumber, canoes, kayaks, or whatever product the user would need to carry. The entire assembly, including the complete rack and mounting brackets, would be protected from the elements and given a desirable appearance by painting, powder coating or whatever exterior surface is desired in whatever colors are available.

The lower support can be attached to the truck by passing it through brackets that are attached to the truck. The brackets are designed to be able to secure the ladder rack to the truck but also make it the rack easy to remove. The rack is secured to the mounting bracket by tightening bolts that are inserted in nuts that are welded to the mount assemblies. The upper and lower supports are connected by a hinge that allows the upper support to pivot about 90 degrees. The hydraulic assist cylinder that is attached to the upper and lower supports can help in lifting whatever is to be carried on the rack. The upper mounting assembly would be designed to accommodate whatever is being carried. They would be designed to the specifications of the person using the rack. Because of the versatility of the ladder version, the rack would normally be assembled with the ladder upper mounting assembly.

The ladder rack would be made from steel, aluminum or any other suitable material that can be welded and drilled. The parts would be cut from the material chosen and then joined using welds and/or bolts where appropriate. The hydraulic assist cylinder would be attached with bolts through holes drilled in the hinge plate and the upper assist bracket. It would be possible to attach the cylinder in different locations and a different type of lift assist such as a cable system or spring assist could be used to help lift the object being carried. The pivot hinge could be made from a section of pipe or tubing or a commercially available hinge could be used. It would be possible to attach the cylinder in different locations and a different type of lift assist such as a cable system or spring assist could be used to help lift the object being carried. The pivot hinge could be made from a section of pipe or tubing or a commercially available hinge could be used.

The procedure for using the lift rack would be as follows. First the mounting brackets would need to be installed in the bed of the truck. The mounting brackets would need to be attached to the side rails and the truck bed. Then the racks would be inserted in the mounting brackets and secured with the several bolts. Now the locking safety pins would be removed from the upper travel position and the upper support would be manually pulled to the horizontal position and the locking pins inserted in holes in the lower support and hinge plate to hold the upper support and upper mounting assembly in the horizontal position. This would be repeated for both lifts. If a ladder was being installed on the rack, it would be laid on the ground in a horizontal position. It would then be lifted until the upper leg of the ladder cleared the curved portions of both mounting assemblies. It would then be placed so the ladder was hanging by the upper ladder leg from the curved portion of the mounting assembly. The ladder should be approximately centered between the two arms on the mounting assemblies. The ladder would now be supported by the curved portion of the mounting assembly passing through the ladder rungs in two locations. The ladder would then be rotated in an arc until what was the lower ladder leg is now the upper leg and the ladder contacts the upper portion of the mounting assembly. A rope, bungee cord or straps would secure the ladder to the mounting assembly to prepare it for travel. There would be holes drilled at each end of the mounting assembly for the hooks at the end of the straps to pass through. The strap or rope or bungee would wrap around the ladder securing it to the mounting assembly and then be secured using the second hole in the assembly. Once the ladder (or whatever was being carried) is secure it will be lifted to the vertical.

It should be understood, of course, that the foregoing relates to exemplary embodiments of the invention and that modifications may be made without departing from the spirit and scope of the invention as set forth in the following claims.

What is claimed is:

1. A movable rack comprising:
a lower support;
an upper support movable between a travel position, disposed alongside of the lower support, and a loading position, disposed at an angle relative to the lower support;
a lift assist cylinder with a first end and a second end wherein the first end is connected to the back of the lower support;
a hinge plate with a first side with a front end and a back end and a second side with a front end and a back end wherein the lower support is located between the first side and the second side of the hinge plate and wherein the first side and the second side are connected by a hinge pin from side to side at the back ends beyond the back of the lower support and wherein the lift assist cylinder is connected at the second end to the hinge pin and further wherein the upper support is connected between the first side and the second side of the hinge plate at the front ends; and
a mounting assembly attached to an end of the upper support.

2. The movable truck rack of claim 1, wherein the mounting assembly is adapted to support an item to be carried.

3. The movable truck rack of claim 1, further comprising an upper mounting bracket fitting about the lower support and a lower mounting bracket fitting on an end of the lower support.

4. The movable truck rack of claim 1, wherein said lift assist cylinder is attached to a plate extending from the back of the tower support.

5. The movable truck rack of claim 4, further comprising a mounting pin pivotably connecting the lift assist cylinder to said plate.

6. The movable truck rack of claim 1, wherein the mounting assembly includes a base with a first end thereof and a second, opposite end thereof, the first end and the the second end forming, with the base, an item carrying surface.

7. The movable rack of claim 6, further comprising a cord spanning from the first end to the second end.

8. A movable rack for attachment with a truck, the movable rack comprising:
   a lower support;
   an upper mounting bracket fitting about the lower support and a lower mounting bracket fitting on an end of the lower support;
   an upper support movable between a travel position, disposed alongside of the lower support, and a loading position, disposed at an angle relative to the lower support;
   a lift assist cylinder with a first end and a second end wherein the first end is connected to the back of the lower support and a hinge plate with a first side with a front end and a back end and a second side with a front end and a back end wherein the lower support is located between the first side and the second side of the hinge plate and wherein the first side and the second side are connected by a hinge pin from side to side at the back ends beyond the back of the lower support and wherein the lift assist cylinder is connected at the second end to the hinge pin and further wherein the upper support is connected between the first side and the second side of the hinge plate at the front ends, the lift assist cylinder operable to assist a user in moving the mounting assembly from the loading position to the travel position;
   a locking mechanism adapted to lock the upper support in the travel position, adjacent to the lower support; and
   a mounting assembly attached to an end of the upper support, the mounting assembly adapted to contain an item to be carried.

9. The movable rack of claim 8, wherein said first end of said lift assist cylinder is attached to a plate extending from the back of the lower support.

10. The movable rack of claim 8, wherein the mounting assembly includes a base with a first end thereof and a second, opposite end thereof, the first end and the the second end forming, with the base, an item carrying surface.

11. The movable rack of claim 10, further comprising a cord spanning from the first end to the second end.

12. The movable rack of claim 1 wherein the mounting assembly is conformed to carry an item and wherein the item to be carried is selected from a grow consisting of: ladders, surfboards, pipes, lumber, canoes and kayaks.

13. The movable rack of claim 9 further comprising a mounting pin pivotably connecting the lift assist cylinder to said plate.

14. The movable rack of claim 1 further including more than one lower support and more than one upper support.

15. The movable rack of claim 8 further including two lower supports and two upper supports.

16. The movable rack of claim 3 wherein the lower mounting bracket includes a base and sides wherein the base is attachable to a structure and wherein the sides are conformed to receive and contain the end of the lower support.

17. The movable rack of claim 16 further including retaining bolts conformed to fit into holes in said sides of the lower mounting bracket and to retain the end of the lower support in the lower mounting bracket.

18. The movable rack of claim 8 wherein the lower mounting bracket includes a base and sides wherein the base is attachable to a truck and wherein the sides are conformed to receive and contain the end of the lower support.

19. The movable rack of claim 18 further including retaining bolts conformed to fit into holes in said sides of the lower mounting bracket and to retain the end of the lower support in the lower mounting bracket.

20. The movable rack of claim 8 wherein the item to be carried is selected from a group consisting of: ladders, surfboards, pipes, lumber, canoes and kayaks.

* * * * *

UNITED STATES PATENT AND TRADEMARK OFFICE
CERTIFICATE OF CORRECTION

PATENT NO. : 8,833,621 B2  Page 1 of 1
APPLICATION NO. : 13/651366
DATED : September 16, 2014
INVENTOR(S) : Mark Louis Burkhardt It is certified that error appears in the above-identified patent and that said Letters Patent is hereby corrected as shown below:

In the Claims

In Claim 2, Column 4, Line 49, delete the word "truck".

In Claim 3, Column 4, Line 51, delete the word "truck".

In Claim 4, Column 4, Line 55, delete the word "truck"; Line 57, change the word "tower" to -lower-.

In Claim 5, Column 4, Line 58, delete the word "truck".

In Claim 6, Column 4, Line 61, delete the word "truck".

In Claim 12, Column 6, Line 7, change the word "grow" to -group-.

Signed and Sealed this
Twenty-third Day of December, 2014

Michelle K. Lee
*Deputy Director of the United States Patent and Trademark Office*